United States Patent [19]

Danna

[11] 4,258,458
[45] Mar. 31, 1981

[54] BLANK FOR STONE SETTING

[75] Inventor: Louis J. Danna, East Greenwich, R.I.

[73] Assignee: B. B. Greenberg Co., Providence, R.I.

[21] Appl. No.: 112,073

[22] Filed: Jan. 14, 1980

[51] Int. Cl.³ .............. B23P 5/00; B21D 7/03; A44C 17/02; A44C 17/04
[52] U.S. Cl. .................. 29/10; 29/160.6; 63/27; 72/379; 428/571; 428/580; 428/582; 428/584; 428/597; 428/598; 428/599
[58] Field of Search .............. 63/26, 27, 28; 29/10, 29/160.6; 72/379; 428/571, 580, 582, 584, 596, 597, 598, 599

[56] References Cited

U.S. PATENT DOCUMENTS

| 203,675 | 5/1878 | Tucker | 72/379 X |
| 261,542 | 7/1882 | Feeley | 63/27 X |
| 608,362 | 8/1898 | Dover | 63/27 X |
| 802,326 | 10/1905 | Sadler | 63/27 X |
| 1,205,175 | 11/1916 | Dodds | 428/596 |
| 1,484,628 | 2/1924 | Dinhofer | 428/580 X |
| 1,782,329 | 11/1930 | Webster | 428/596 X |
| 2,188,310 | 1/1940 | Price | 428/571 |
| 2,626,454 | 1/1953 | Richardson | 72/379 X |
| 2,944,330 | 7/1960 | Swick | 428/582 X |

FOREIGN PATENT DOCUMENTS 1782432  1/1973  Fed. Rep. of Germany ............. 63/26

Primary Examiner—F. Barry Shay
Attorney, Agent, or Firm—Salter & Michaelson

[57] ABSTRACT

A blank for a stone setting comprising a base and prongs extending radially therefrom, said blank having a planar lower side and a notched upper side, the notches at the upper side defining at the junctions of the prongs with the base hinges which enable bending the prongs upwardly relative to the base to form a stone cage and at the distal ends thereof a seat for the stone and tangs for fixing the stone against the seat. A method of making a setting including making the blank by striking it from malleable sheet metal, removing parts of the sheet metal from around the bank, stripping the blank from the sheet metal, using a punch to force it into a die for bending the prongs and tangs at their notched areas to shape it into a cage. A further method of setting a stone by seating a stone against the seat at the top of the cage and bending the tangs against the stone.

11 Claims, 6 Drawing Figures

U.S. Patent  Mar. 31, 1981  4,258,458
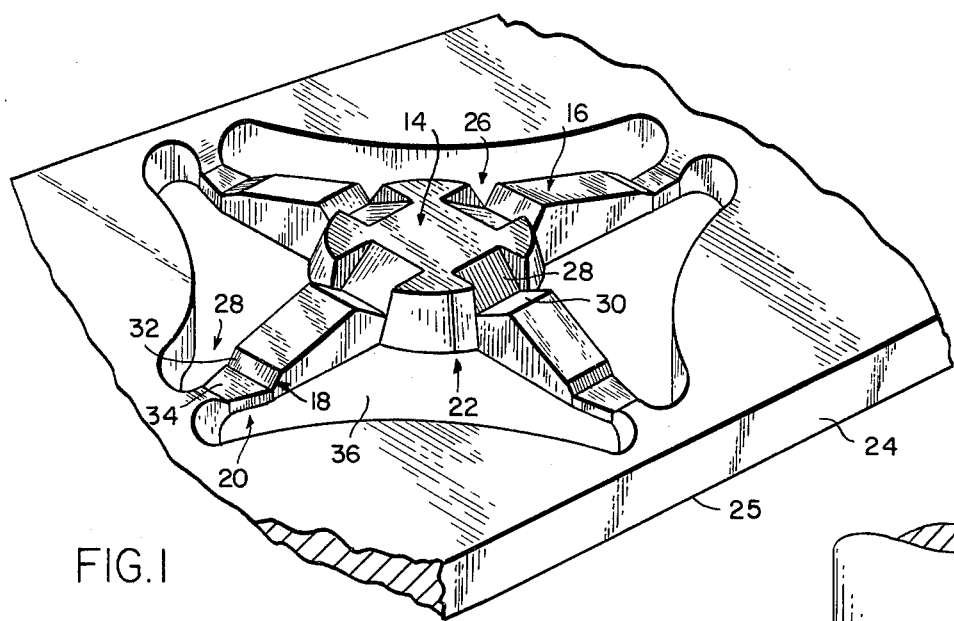
FIG.1
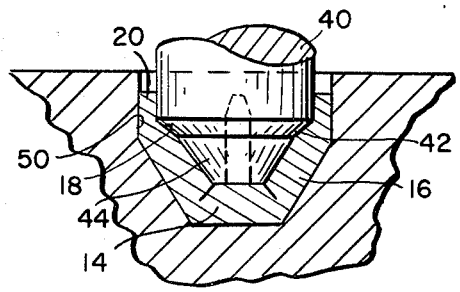
FIG.2
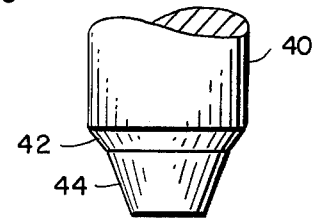
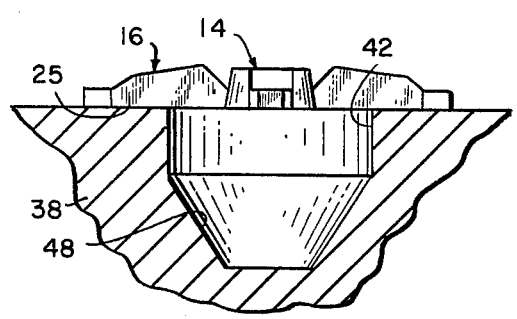
FIG.3
FIG.4
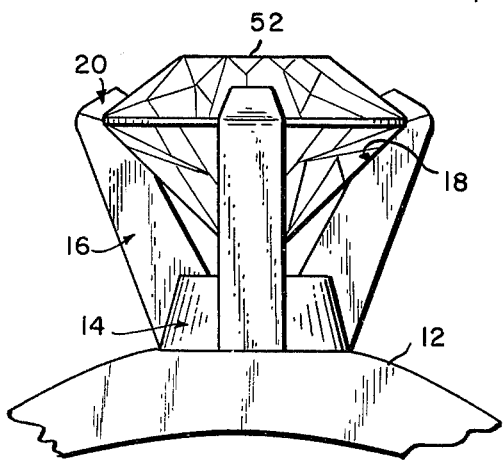
FIG.5
FIG.6

BLANK FOR STONE SETTING

BACKGROUND OF THE INVENTION

This invention relates to settings for precious stones and, in particular, to striking blanks from sheet material which may then be folded with the aid of a simple punch and die into a stone cage with a seat upon which the stone may be seated and tangs for folding over the upwardly-facing side of the stone to secure the stone against the seat.

SUMMARY OF THE INVENTION

As herein illustrated, the invention comprises in one aspect a blank for a stone setting comprising a base and prongs extending radially therefrom, said blank having a planar bottom side and notches at the upper side, said notches at the upper side defining at the junction of the prongs with the base hinge means which enable bending the prongs upwardly relative to the base to form a stone cage and at the distal ends shoulders upon which the stone may be seated and tangs which may be bent over to secure the stone against the seat. The notches at the junction of the prongs with the base are defined by upwardly-facing, downwardly-converging, flat surfaces which meet at the junction of the prongs with the base and the notches at the distal ends of the prongs are defined by upwardly-facing surfaces inclined downwardly and extending horizontally.

According to the method, blanks are struck from sheet material, having a planar bottom side and notches at the upper side, at the junctions of the prongs with the base and at the distal ends of the prongs, said notches at the junctions defining at the junctions hinge means and at the distal ends shoulders spaced from the ends and tangs and with the aid of a punch and die, forming the blanks to a die constructed to fold the prongs upwardly at the hinges relative to the base to form a stone cage wherein the shoulders collectively define a seat for a stone and the tangs collectively provide clinchers for fixing the stone against the seat.

The invention will now be described in greater detail with reference to the accompanying drawings, wherein:

FIG. 1 is a perspective to very large scale of a fragmentary portion of sheet metal from which the stone settings are struck showing the blank formed and cut away from the sheet except for the extremities of its prongs;

FIG. 2 is a fragmentary section taken longitudinally of a prong showing its junction with the base;

FIG. 3 is an elevation partly in section showing a blank after its removal from the sheet from which it was struck resting between the upper surface of a die beneath the punch with the die shown in section;

FIG. 4 is a fragmentary section similar to FIG. 3 showing the blank forced into the die;

FIG. 5 shows the blank formed into a stone cage; and

FIG. 6 is an elevation to larger scale showing a stone seated in the stone cage against the seat with the tangs at the ends of the prongs engaged with the upwardly-facing side of the stone for locking the latter against the seat.

Referring to the drawings, FIGS. 5 and 6, there is shown a stone cage 10, FIG. 5, attached to a ring band 12, FIG. 6. The cage comprises a base part 14, upstanding, outwardly-inclined prongs 16 having at their upper ends upwardly-facing inclined shoulders 18 and at their extremities tangs 20. The shoulders 18 collectively define a seat for a stone as shown in FIG. 6 for receiving and supporting the downwardly-facing side of a stone and the tangs 20 provide for securing the stone against the seat when folder or bent inwardly against the upwardly-facing side of the stone.

The stone cage 10 is made according to this invention from a blank 22, FIG. 1, which is struck from a sheet of malleable metal 24 of suitable thickness and composition, for example, sterling silver. The blank 22 as struck from the sheet 24 has a bottom planar side 25 and a notched upper side. The base 14 is a truncated cone and the prongs 16 taper toward their distal ends. There are notches 26 at the junctions of the prongs 16 with the base 14 which define hinge means and notches 28 at the distal ends of the prongs which define shoulders 18 and tangs 20. The notches 26 at the junctions of the prongs with the base are depressions formed in the top side partway through the material of the blank and are defined by upwardly-facing, downwardly-converging surfaces 28 and 30 formed, respectively, in the prongs and the base which intersect above the bottom side and are disposed at an inclination such as to enable folding the prongs upwardly relative to the base to the positions illustrated in FIG. 5. The depressions are deep enough to provide hinge means 26a, FIG. 2, at the junctions of the prongs with the base upon which the prongs can be bent upwardly. The notches 28 at the distal ends of the prongs are depressions formed from the top side partway through the material of the blank and are defined by upwardly-facing surfaces 32 and 34, the former sloping downwardly and defining the shoulders 18 and the latter being substantially parallel to the bottom side and defining the tangs 20. The upper sides of the prongs between the notches 26 and 28 slope from the notches 26 downwardly and outwardly toward the notches 28 so that the prongs taper from their proximal ends to their distal ends. The sides of the prongs are parallel. The blank is formed by removal of the generally triangular sections of metal 36, FIG. 1, leaving the distal ends of the prongs still attached lightly, but sufficiently weakened at their place of attachment so that the blank can be easily stripped from the sheet. The blanks are now placed between a die 38 and punch 40, FIG. 3, with the bottom planar side resting on the top of the die, whereupon the punch is lowered to press the blank into the die cavity 42, FIG. 4, which is structured when the punch is lowered into it to bend the prongs upwardly relative to the base and to bend the tangs at their extremities relative to the shoulders as shown in FIG. 4. The punch 40 as shown in FIGS. 3 and 4 is provided with conical end portions 44 and 46 which, respectively, in conjunction with the conical and cylindrical portions 48 and 50 of the die determine the inside and outside dimensions of the cage. Following forming of the blank into a stone cage as shown in FIG. 5, a stone 52 is placed within the cage so that its downwardly-facing side rests on the shoulders 18, and the tangs 20 formed by bending over the upwardly-facing sides of the stone.

While the cage formed from the blank is shown attached to a ring band, it is within the scope of the invention to attach it to other items of jewelry such, for example, as ear studs or tie pins.

It should be understood that the present disclosure is for the purpose of illustration only and includes all modifications or improvements which fall within the scope of the appended claims.

I claim:

1. The method of making a setting for a stone comprising striking from a sheet of malleable metal a blank embodying a base and radially-extending prongs, the blank having a planar bottom side and notches at the upper side at the junction of the prongs with the base and at the distal ends of the prongs, said notches at the junctions defining hinge means connecting the prongs to the base and said notches at the distal ends defining shoulders spaced from the ends and tangs, and with the aid of a punch and die forcing the blank into a die constructed to fold the prongs upwardly at their hinges relative to the base to positions wherein the shoulders collectively define a seat for a stone and the tangs collectively define clinchers for fixing the stone against its seat.

2. The method according to claim 1 comprising bending the prongs upwardly at the hinges relative to the base to positions inclined to the base and bending the tangs at the ends thereof to positions substantially perpendicular to the base.

3. The method according to claim 2 comprising seating a stone on the shoulders and bending the tangs inwardly into engagement with the upwardly-facing side of the stone.

4. A blank for a stone setting comprising a base and prongs extending radially therefrom, said blank having a planar bottom side and notches at the upper side, said notches at the upper side defining at the junction of the prongs with the base hinge means which enable bending the prongs upwardly relative to the base to form a stone cage and at the distal ends of the prongs a seat for the stone and clinchers for fixing the stone against the seat.

5. A blank for a stone setting comprising a base, prongs extending radially therefrom, said blank having a planar bottom side, depressions in the opposite side at the junctions of the prongs with the base defining hinge means at said junctions, and depressions at the distal ends of the prongs defining seats and clinchers.

6. A blank for a stone setting comprising a base and prongs extending radially therefrom, said blank having an upper and a bottom side, notches on said upper side at the junctions of the prongs with the base to enable bending the prongs upwardly relative to the base, and notches on said upper side at their distal ends to provide, when the prongs are bent upwardly, seats for the stone and clinchers for fastening the stone against the seats.

7. A blank for a stone setting comprising a base and prongs extending radially therefrom, said blank having a planar bottom side and depressed notches at the top side comprising notches at the junctions of the prongs with the base and notches at the distal ends of the prongs, said notches at the junctions of the prongs with the base having upwardly-facing, downwardly-inclined surfaces which intersect above the bottom side and the notches at the distal ends of the prongs having upwardly-facing surfaces which slope downwardly and are parallel and which intersect above the bottom side.

8. A blank according to claim 4 wherein the base is of truncated conical configuration.

9. A blank according to claim 4 wherein the prongs taper from their proximal ends to a narrower dimension toward their distal ends.

10. A blank according to claim 4 wherein the prongs have parallel sides.

11. A blank according to claim 4 wherein there are four prongs spaced at equal distances about the base.

* * * * *